United States Patent [19]
Kogure

[11] Patent Number: 6,023,399
[45] Date of Patent: Feb. 8, 2000

[54] DECENTRALIZED CONTROL SYSTEM AND SHUTDOWN CONTROL APPARATUS

[75] Inventor: Makoto Kogure, Hitachinaka, Japan

[73] Assignee: Hitachi, Ltd., Tokyo, Japan

[21] Appl. No.: 08/934,936

[22] Filed: Sep. 22, 1997

[30] Foreign Application Priority Data

Sep. 24, 1996 [JP] Japan ..................................... 8-251193
Nov. 25, 1996 [JP] Japan ..................................... 8-313331

[51] Int. Cl.[7] .................................................. H02H 5/00
[52] U.S. Cl. .............................. 361/23; 361/62; 361/78; 361/93; 361/115
[58] Field of Search .................................. 361/62, 64, 66, 361/78, 93, 115, 119, 23, 24, 25

[56] References Cited

U.S. PATENT DOCUMENTS 4,604,693  8/1986  Chadima .................................. 364/200
4,634,812  1/1987  Hornburger .............................. 379/269

FOREIGN PATENT DOCUMENTS 4332099A  11/1992  Japan .............................. G08C 25/00
9130312A   5/1997  Japan .............................. G08C 15/00

*Primary Examiner*—Stephen W Jackson
*Attorney, Agent, or Firm*—Kenyon & Kenyon

[57] ABSTRACT

In a decentralized control system configuring a network between plural field devices for measuring and controlling the controlled objects and plural upper-level apparatus for communicating data to the field devices and controlling the field devices, and forming a control loop among the devices, in which the field device has a normal communication means for communicating with other devices in a normal operation mode, and an emergency communication means for communicating with other devices in an emergent operation mode, in which the normal communication means and the emergency communication means use their own communication signals and the emergency communication means operates in an asynchronous communication mode. In addition, on the network, a shutdown control means is formed for transmitting a shutdown command signal to the shutdown target control device if necessary by detecting the abnormal state of the individual devices.

16 Claims, 13 Drawing Sheets

FIG. 5 (a) FIELD DEVICE i (DIFFERENTIAL PRESSURE TRANSMITTER)
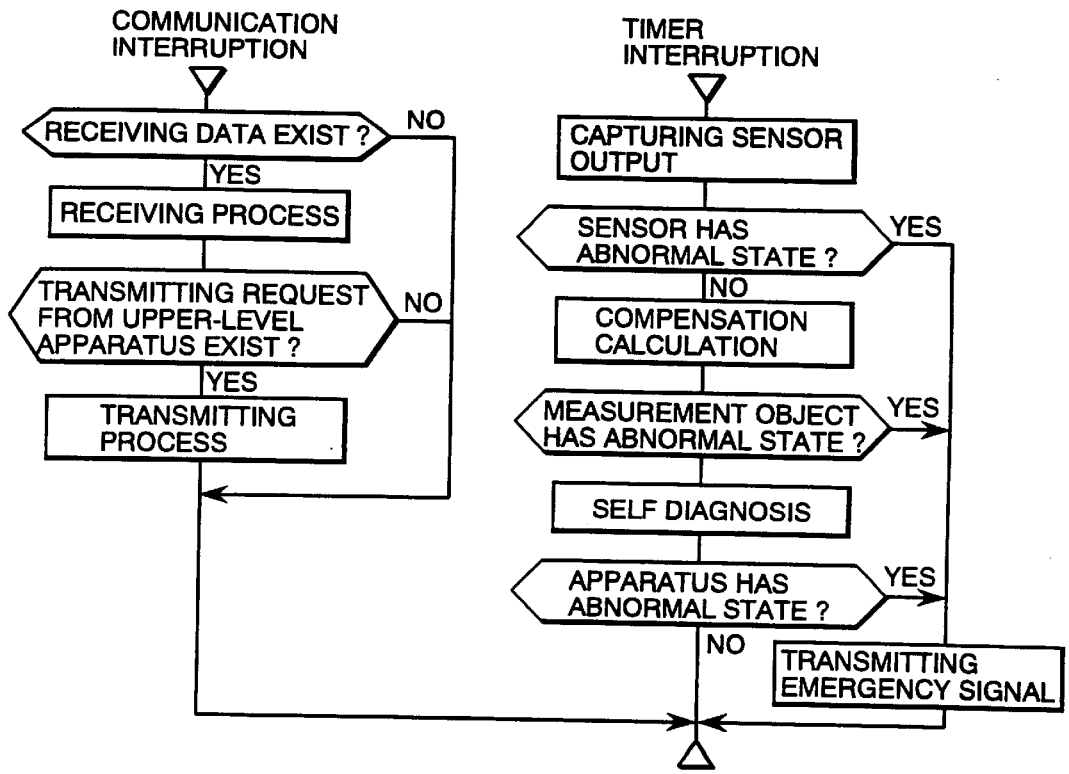
FIG. 5 (b) FIELD DEVICE ii (VALVE)
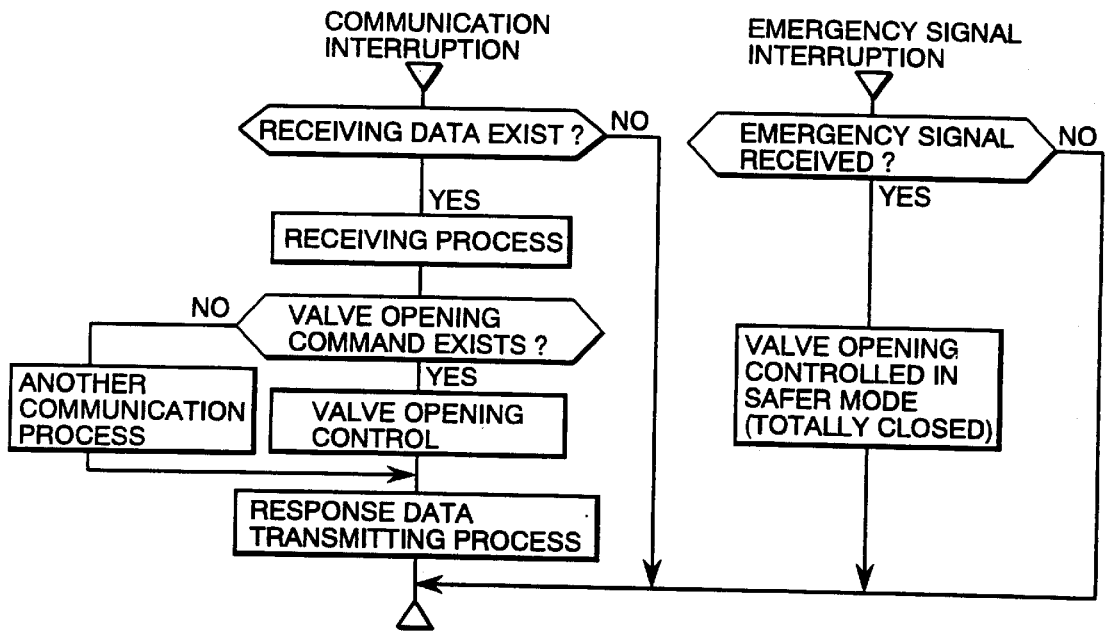

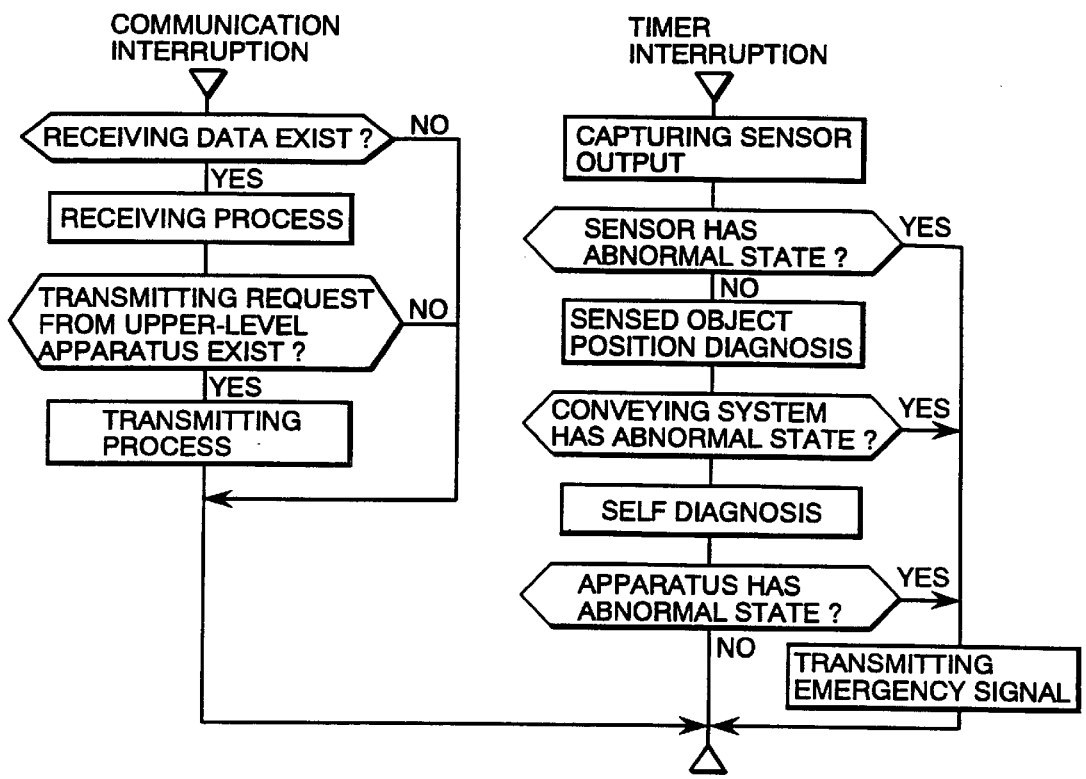
FIG. 6 (a) FIELD DEVICE i (PHOTO SENSOR)
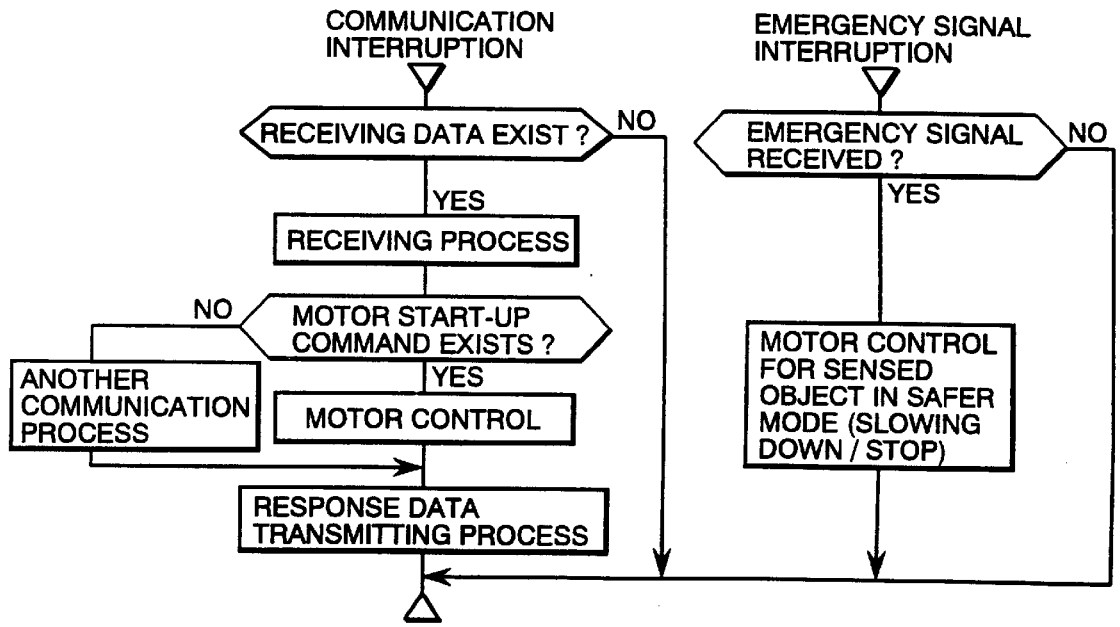
FIG. 6 (b) FIELD DEVICE ii (MOTOR CONTROLLER)

DECENTRALIZED CONTROL SYSTEM AND SHUTDOWN CONTROL APPARATUS

BACKGROUND OF THE INVENTION

The present invention relates to a decentralized control system defining a network by configuring devices in a decentralized environment and connecting devices by transmission paths composed of pairs of transmission lines between devices, and controlling control objects with devices configured in a decentralized environment.

In the field of Process Automation, the so-called field device includes the sensors used for detecting the physical values of the plant process, such as pressure, temperature and flow rate, and for converting the detected values to the electric signal and transmitting them through the transmission path to the upper-level controller (upper-level apparatus), and the actuators such as valves used for receiving the control signal transmitted from the upper-level controller and controlling the plant process such as flow rate.

In the field of Factory Automation, the field device includes the motors for driving the machines and the photo sensor for detecting the position for the upper-level controller controlling the conveying system.

In the device connection configuration of the conventional system, the upper-level controller and the field device is directly connected to each other, and the upper-level controller controls the individual field device. Therefore, the field device can not be controlled without the upper-level controller.

In the field of Process Automation, the standardized transmission line using the analog current signal between 4 and 20 mA is commonly used for the connection line between the field device and the upper-level controller.

In recent years, due to the advances in semiconductor integrated circuit technology, the field device in which microprocessors are embedded is developed and used in practical use. With this microprocessor-based field device, plural field devices are connected on the identical transmission path in the form of multi drop configuration, and the network is configured with the bi-directional digital signal communication, and not only the transmission of the instrument and control information but also the range setup and self diagnosis of the field device can be controlled in the remote environment.

Field Bus, LonWork and DeviceNet are major products in the field network technology, and the decentralized network system is extensively used for the field device level architecture in various field of control systems.

A representative example of the configuration of Field Bus system is described by referring to FIG. 3 as one of the field network systems.

FIG. 13 shows an example of the apparatus configuration in which plural field devices and the upper-level controller are connected through the transmission path in a tree topology, and is a typical instrument and control system using Field Bus. In this system, the field device is operated with the electric power supplied through the transmission path by the external power supply embedded inside the upper-level apparatus (controller), and the field device communicates digital signals with the controller in the bi-directional communication mode for transmitting the detected physical values and receiving the control value. The upper-level communication apparatus (communicator) is connected between the field device and the upper-level apparatus, and communicates digital signals with the field device in the bi-directional communication mode. The terminator (not shown) is composed of resistors and condensers connected in series and connected between the both lines of the transmission path.

In the field network system described above, as plural devices are connected on the transmission path, in case that any one of the field devices has an abnormal state, it is required to transfer the information reporting the abnormal state promptly to the related devices and controllers in order to keep the whole network system from shutdown, and furthermore, it is expected that the field device which recognizes the information related to the abnormal state control the plant process so as to transit to the safer mode.

In order to attain the above requirement, the conventional system uses the following communication method and network control method.

At first, by referring to Japanese Patent Application Laid-Open No. 4-332099 (1992), a typical method for emergency communication operation when the abnormal state generates in the field bus system is described. The configuration of the communication method disclosed in Japanese Patent Application Laid-Open No. 4-332099 (1992) is shown in FIG. 14.

FIG. 14 shows an apparatus configuration in which plural field devices and a single upper-level controller are connected in a bus topology, representing a part of the basic field bus system. In FIG. 14, the field devices $1a$, $1b$ and in are operated with the electric power supplied through the transmission path 5 by the external power supply embedded inside the upper-level controller, and the field device communicates digital signals with the upper-level controller 3 in the bi-directional communication mode for transmitting the detected physical values and receiving the control value.

Next, by referring to FIG. 15, the basic communication signal transmission process is described.

FIG. 5($a$) shows the command issued by the upper-level controller; FIG. 5($b$) shows the response of the field device $1a$; FIG. 15($c$) shows the response of the field device $1b$; FIG. 5($n$) shows the response of the field device in; and FIG. 5($z$) shows the scan interval of the upper-level controller. The upper-level controller submits the command signal CMDa onto the transmission path 5 for calling the field device $1a$, the field device $1a$ detects the command signal CMDa and sends back the measurement values such as its status and measured temperature as the response RESa to the upper-level controller. Thus, the upper-level controller collects the data measured at the field device $1a$. Next, the upper-level controller submits the command signal CMDb onto the transmission path 5 for calling the field device $1b$, the field device $1b$ detects the command signal CMDb and sends back the measurement values such as its status and measured temperature as the response RESb to the upper-level controller. So far, by repeating also the above operation similarly for the rest of the field devices, the upper-level controller collects the data from the field devices $1a$ to $1n$ sequentially.

In the communication method as described above, there is such a problem that, in case that the field device has an abnormal state, the abnormal state can not be reported by interrupting the communication interval. In the communication method disclosed in Japanese Patent Application Laid-Open No. 4-332099 (1992), for the method of transmitting the abnormal state of the device promptly under the predefined scheduled communication condition, the following scheme is proposed; the signal formed with the communication frequency different from that used for the normal signal communication by the field device is transmitted as the signal for interrupting the predefine scheduled communication operation, and after the upper-level controller detects this interruption signal and suspends the communication operation, the ID code of the field device to which the shutdown or suspend request is issued is transmitted from this field device to the upper-level controller, and then, the upper-level controller identifies the field device having an abnormal state.

Next, an example of controlling the network under emergency operation is described.

As plural field device are connected to a single transmission path in the decentralized field network system such as Field Bus System, in case that a single field bus happens to run away out of control due to any reason, it is required to reset the whole bus system in order to resolve this abnormal status. However, in case that the whole bus system can not continue to communicate signals due to the runaway field device, the whole bus system can not be reset under on-line mode but it is required to reset the whole bus system by shutting down the electric supply to the individual field device in the manual operation.

In case that the transmitting circuit of the field device has an abnormal state and the communication signal can not be transmitted from the field device, there is such a problem that the field device can not restore its abnormal state by itself and report its abnormal state to another device.

In order to resolve the above described problems, the following method is proposed in Japanese Patent Application Laid-Open No.9-130312 (1997); in case that the field device itself fails to detect its abnormal state or one field device fails to detect an abnormal state of the other field device and that the signal communication is disturbed due to this kind of detection failure, the electric current consumption of the field device is forced to be increased temporarily so that the voltage between the transmission lines at the field side may be the minimum operating voltage or smaller, and then, the individual field devices are forced to be reset in order to restore the abnormal state.

However, in the conventional communication method under the emergency operation, in case that the number of the connected field devices is large, though the information related to the abnormal state of the field device can be promptly transmitted to the upper-level controller, the following problems can not be resolved.

1. As the case that the upper-level controller has an abnormal state is not assumed, the abnormal state of the overall system can not be rescued.
2. The operation for resolving the abnormal state with interacting with the upper-level controller is so complex and the prompt rescue operation is difficult.
3. As the signal communication between the field devices can not be realized, the abnormal state of the overall system can not be resolved quickly by exchanging the information related to the abnormal state directly between the field devices.
4. In case that the communication circuit in the field device has an abnormal state, the field device having an abnormal state can not be identified.

In the conventional method for the network control under emergency situation, though the abnormal state of the field device can be resolved by resetting the whole bus system, in considering not only the abnormal state of the field device itself but also the abnormal state of the whole plant process, the continuity of the control operation of the field devices is not considered so that the system may be shutdown and the plant process may be moved to the safer mode. Therefore, the decentralized control system using the network such as Field Bus can not be applied to the system components and part which requires the highly reliable architecture for shutdown control, and hence, the shutdown control loop should be separately configured for the system components requiring the highly reliable architecture.

In many conventional field network systems mainly using digital signals for the communication operation, the reliability for noise resistance should be considered more intensively, and there is such a problem that the normal control operation for the field device scheduled in a constant time interval can not be performed if the communication error happens so often.

SUMMARY OF THE INVENTION

An object of the present invention is to provide a highly reliable decentralized control system for solving the above described problems by using a simple circuit configuration.

The present invention is characterized by the following components all configured together for solving the above mentioned object; a decentralized control system configuring a network between plural field devices for measuring and controlling the controlled objects and plural upper-level apparatus for communicating data to the field devices and controlling the field devices, and forming a control loop among the devices, in which the field device has a normal communication means for communicating with other devices in a normal operation mode, and an emergency communication means for communicating with other devices in an emergent operation mode, in which the normal communication means and the emergency communication means use their own communication signals and the emergency communication means operates in an asynchronous communication mode.

In a preferred case, after the individual field device detects the emergency signal on the transmission path, the individual field device interrupts the control operation of the field device operated in a normal operation mode and switches the operation mode to the emergency operation mode in order to control the controlled object in the safer status.

In another preferred case, the emergency communication means is composed of the emergency signal generating circuit and the emergency signal detecting circuit, and the emergency signal generating circuit and the emergency signal detecting circuit are connected to the field devices through the I/O interfaces of the field devices in order to communicate the emergency signal with a series of signals used by the transmission method different from the transmission method used by the normal communication method.

In another preferred case, the emergency signal detecting circuit generates the emergency signal in responsive to the emergency signal generating signal incoming from the I/O interface.

In another preferred case, the emergency communication means is composed of the emergency signal transmitting circuit, the emergency signal receiving circuit and the emergency signal controller, and the emergency signal receiving circuit and the emergency signal controller are connected to the field device through the emergency signal controller in order to transmit and receive the emergency signal as the data sequence coded in a definite format.

In yet another preferred case, the emergency communication means is so configured as to enable to report the status of the field device urgently even in case that the normal communication means of the field device is in an abnormal state.

The present invention is characterized by the following components all configured together for solving the above mentioned object; a decentralized control configuring a network between plural field devices obtaining electric operation power from the transmission path for measuring and controlling the controlled objects and plural upper-level apparatus for communicating data to the field devices and controlling the field devices, and forming a control loop among the devices, in which a shutdown control means is formed on the network for detecting the abnormal state of the individual device and, if necessary, supplying the shutdown command to the shutdown target control device for which the shutdown operation is required.

In a preferred case, the shutdown control means and the shutdown target device are connected by an independent control signal line other than the above mentioned transmission path.

In a preferred case, the device connected to the shutdown control means by the independent control signal line is a field device performing a physical control operation for the system.

In a preferred case, the shutdown control means is embedded in the field device.

In a preferred case, the shutdown control means is established to be independent of the individual field device on the transmission path.

In a preferred case, the shutdown control means is placed in the relay terminal assembly, and the above mentioned independent signal line is connected between the relay terminal assembly and the shutdown target device.

In a preferred case, the operation power supply from the transmission path to the shutdown target device is interrupted by means that the shutdown target device receives the shutdown signal supplied on the independent signal line.

In a shutdown control system for shutting down an individual device in a decentralized control system configuring a network between plural field devices obtaining electric operation power from the transmission path for measuring and controlling the controlled objects and plural upper-level apparatus for communicating data to the field devices and controlling the field devices, and forming a control loop among the devices, the shutdown control system comprises an independent control signal line other than said transmission path connected to the individual shutdown target devices requiring shutdown control;

an abnormality detection means for detecting an abnormal state of the individual device on the network; and a shutdown control circuit for sending a shutdown command through the control signal line.

In a preferred case, the shutdown control means is embedded in the field device.

The present invention is characterized by the following components all configured together for solving the above mentioned object; in a shutdown control apparatus for shutting down the individual device in the test sample conveying system, the test sample conveying system forming a control loop with the individual devices, and configuring the network through the transmission path between a field device composed of the motor for driving the conveying system or the sensor for detecting the position of the conveyed object, and an upper-level apparatus for communicating with the field device and controlling said field device, the shutdown control apparatus has a control signal line connected to the field device including the motor; an abnormality detection means for detecting an abnormal state of the individual device on the network; and a shutdown control circuit for sending a shutdown command through the control signal line for stopping the motor.

In the decentralized control system of the present invention, as the individual field device located in the field device side other than the upper-level apparatus, for example, detects the abnormal state of the controlled objects, and the control operation mode of the controlled objects is forced to move to the safer mode in an emergency situation, the field device for which the abnormal state is detected outputs the emergency signal onto the transmission path connected identically to all the individual field devices and the field device for controlling the controlled object can receive the issued emergency signal, both communications established independent on the communication system configured for the normal control operation, and thus, the state of the controlled object can be moved quickly to the wafer mode without interaction with the upper-level apparatus.

Also in the decentralized control system of the present invention, as the individual field device located in the field device side other than the upper-level apparatus, for example, detects the abnormal state of the controlled objects, and the control operation mode of the controlled objects is forced to move to the safer mode in an emergency situation, the control command is issued to the field device for controlling the controlled object as the shutdown target control device through the signal line exclusively used for shutdown control established independent on the communication system configured for the normal control operation, and thus, the state of the controlled object can be moved quickly to the wafer mode without interaction with the upper-level apparatus.

BRIEF DESCRIPTION OF THE DRAWINGS

FIG. 5 is an operational flowchart of the field device in the instrument and control system.

FIG. 6 is an operational flowchart of the field device in the test sample conveying system.

PREFERRED EMBODIMENT OF THE INVENTION

Now referring to FIG. 13 describing an instrument and control system, the decentralized control system of the present invention will be described. (the basic configuration of the system is similar to that in the prior art system.)

Figure 13:
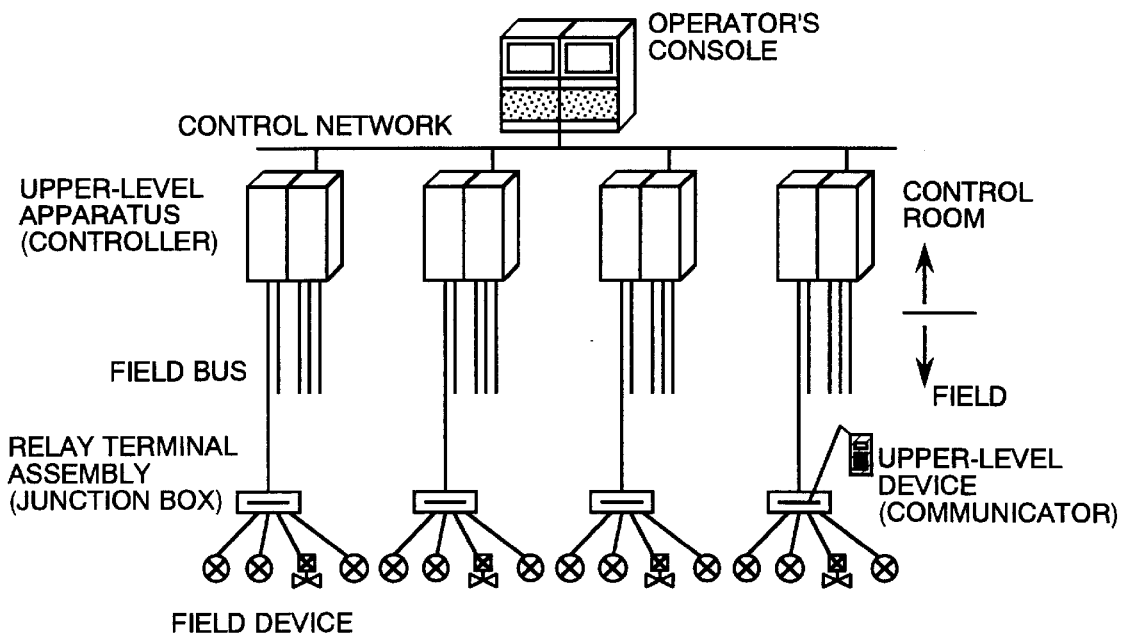
FIG. 13 is a system configuration diagram of the instrument and control system.
Figure 14:
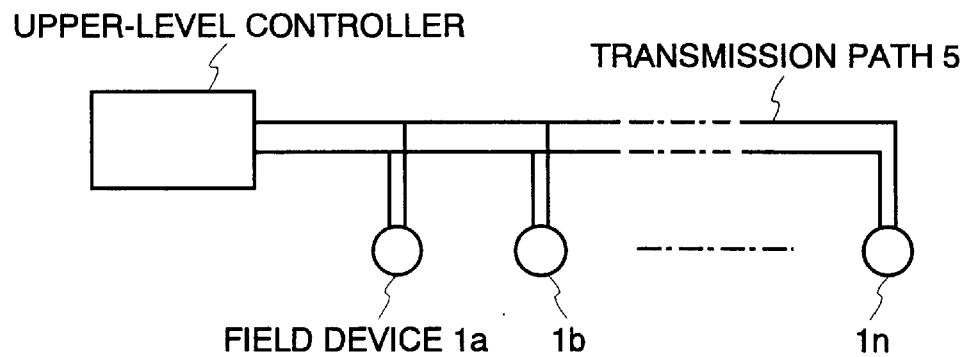
FIG. 14 is a structural configuration of the field bus system in the prior art.
Figure 15:
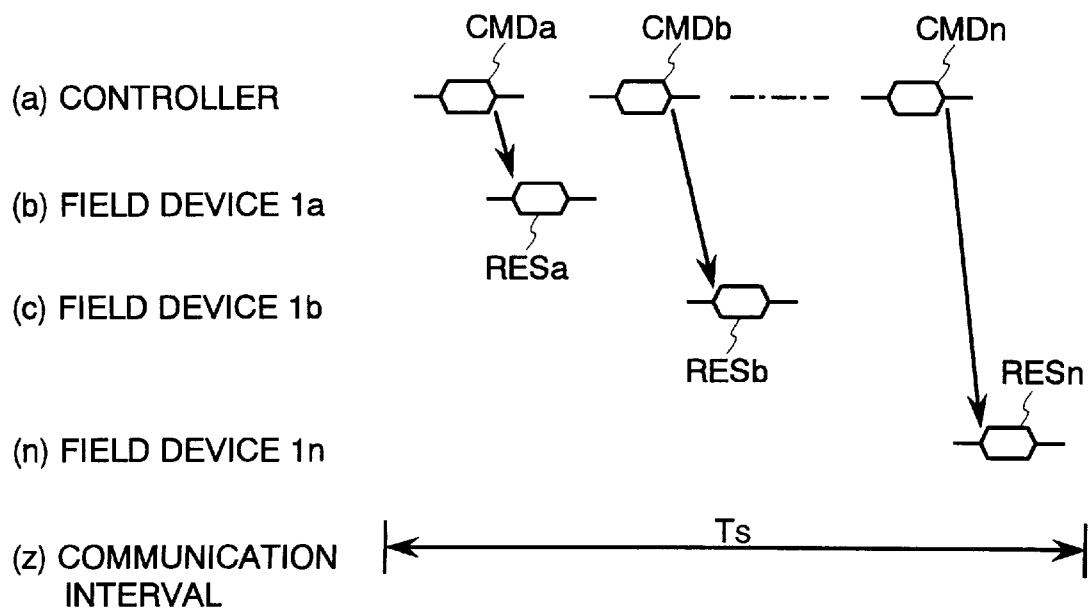
FIG. 15 is a signal operation procedure in the field device in the prior art.

In FIG. 13, the upper-level apparatus for supervising and controlling the overall plant composed of the operator's console placed in the control room, the upper-level apparatus (controller) and the control network connecting them, and the field devices placed in the field side (plant side) are connected by the transmission path (field bus) composed of a pair of field line, and thus, an overall field network system is established.

Figure 2:
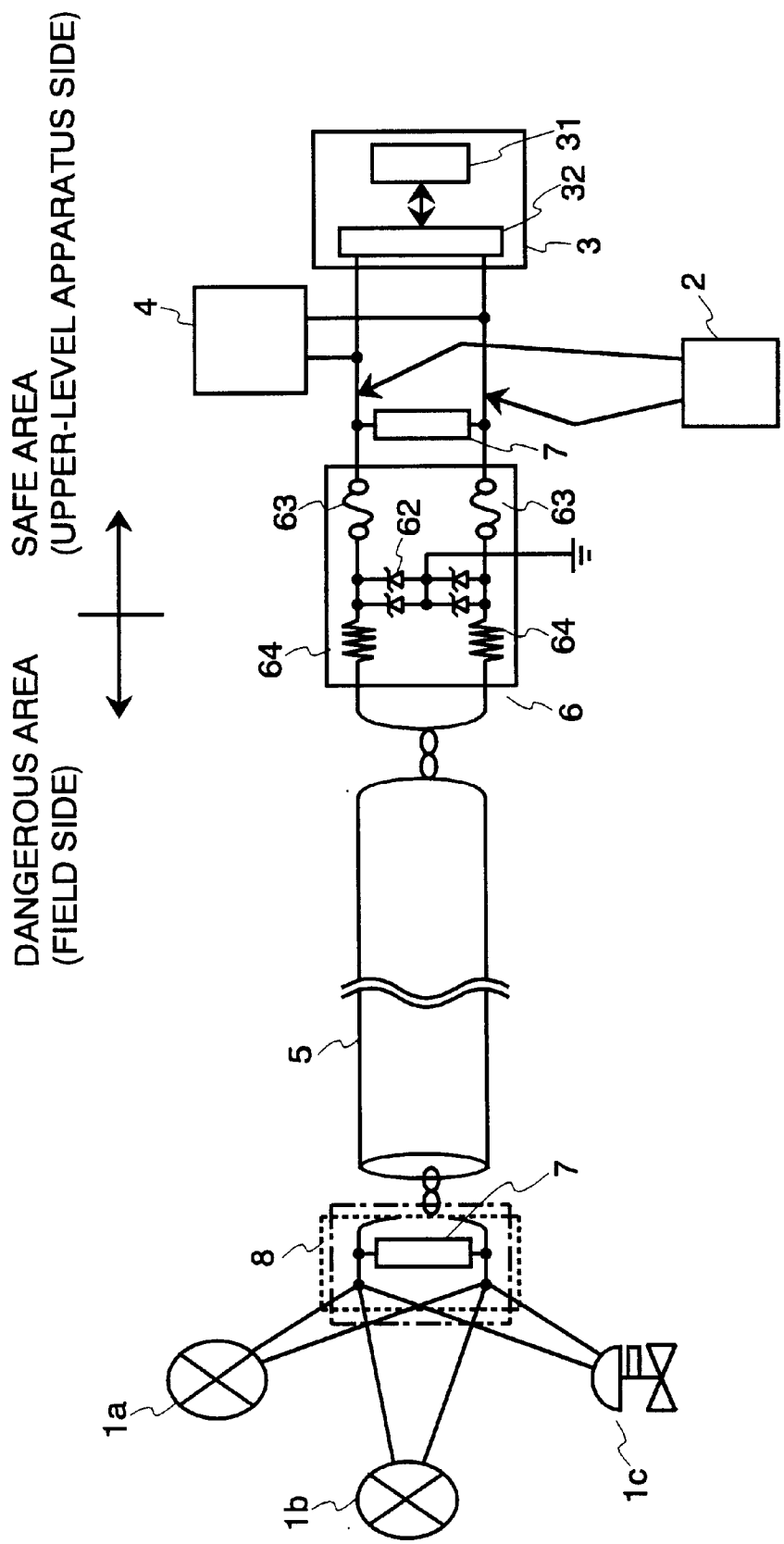
FIG. 2 is a schematic diagram of the field bus system.

FIG. 2 is an example of the system configuration showing the part related to the field bus in the field network system shown in FIG. 13.

In FIG. 2, the field devices 1a, 1b and 1c are used for two-way communication of the digital signals, and they detect the physical values such as pressure, temperature and flow rate of the process in the plant, transmit the detected values and/or receive the control value for valve opening, for example. The field devices 1a, 1b and 1c is operated by the electric power supplied by the external power supply 4 through the transmission path 5, and they can be connected on arbitrary positions on the transmission path 5. In this embodiment, though what is shown is an example in which the field devices 1a, 1b and 1c are connected to the junction box 8 (relay box) located at the field side, it is allowed without problem to make the field devices 1a, 1b and 1c connected to another position, for example, the intermediate position on the transmission path 5.

The barrier 6 is connected between the dangerous area and the safe area under consideration of essential safety explosion proof, and is used for limiting the voltage to be applied to the field device side through the transmission path 5 by the external power supply 4, and the electric current running in the field device side. In this case, the devices having essential safety explosion proof structure is configured as a system in which the energy level in the circuit is so regulated as to preventing the fire flashing even if the circuit of the device makes failure under such a condition that the device is exposed to the explosive gas. The maximum number of the field devices allowed to be connected is determined by considering the relation between the electric current output and the electric current consumption of the field device affordable for the barrier 6.

Next, the operation of the barrier 6 is described.

Figure 3:
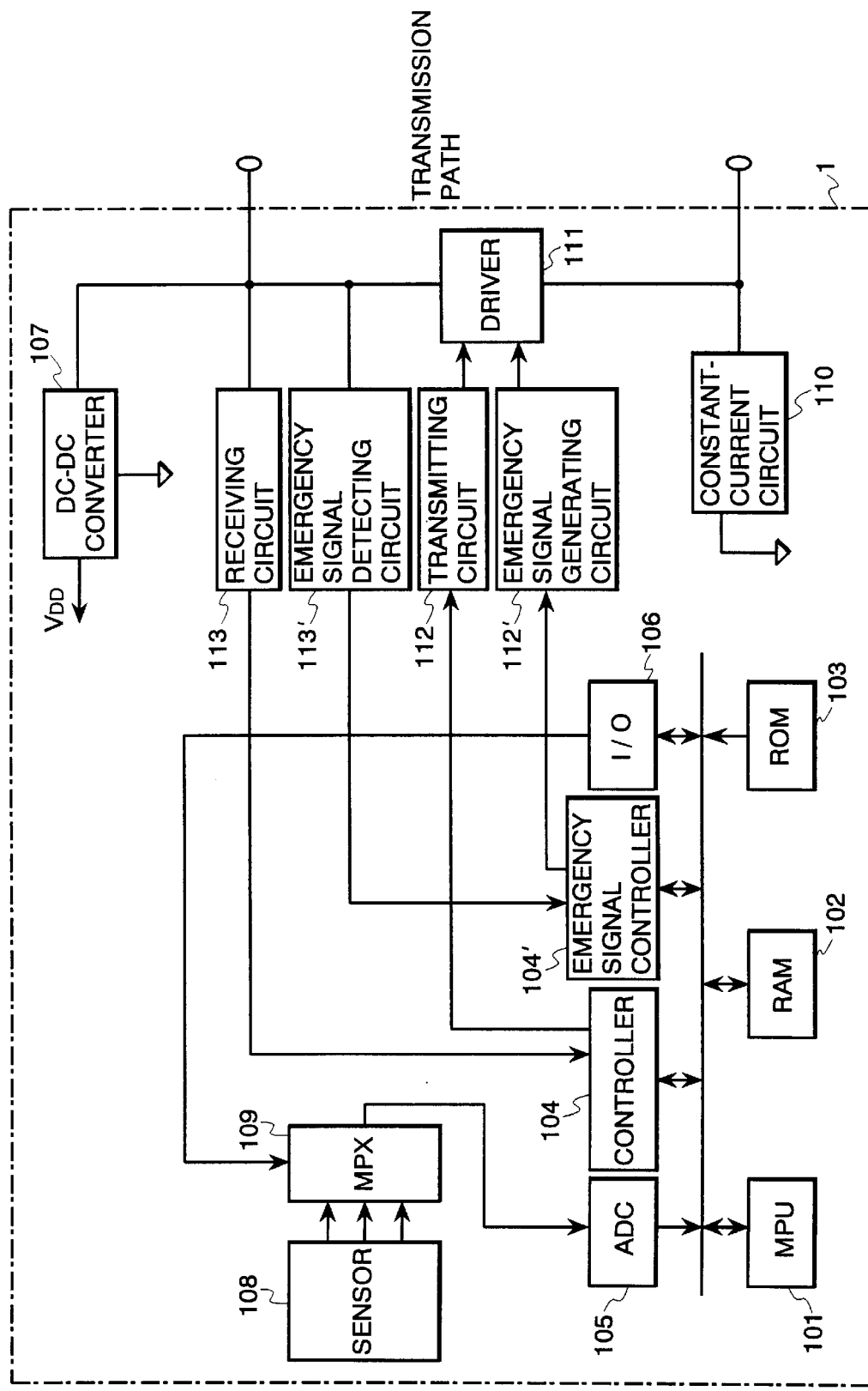
FIG. 3 is a block diagram of the field device in the second embodiment of the present invention.

The zener diode 62 regulates the output voltage of the external power supply 4 to be supplied onto the transmission path 5 through the barrier 6 so as not to get larger than an definite voltage value. In a general case, as shown in FIG. 3, plural zener diodes 62 are connected in parallel in order to assure the above mentioned function even if one of the zener diodes 62 makes failure. The fuse 63 protects the excess electric power consumption of the zener diodes 62 when they fails. The load resistance 64 prevent the excess electric current from running through the transmission path when the transmission path 5 makes short in the dangerous area. With this configuration using the zener diode 62 and the load resistance 64, the voltage between the transmission lines on the transmission path and the electric current running in the transmission path can be regulated within a definite value. Consequently, by means that the energy enabled to be used in the dangerous area is regulated to be within a definite value the energy level assuring that the fire flash can not arise in the gas or the mist under essential safety explosion proof), essential safety explosion proof system can be realized.

The upper-level apparatus 3 communicates the digital signals through the transmission path 5 with the field bus compatible device including the field devices 1a, 1b and 1c, and upper level communication device 2, and receives the physical process values (pressure, temperature and flow rate) detected by the field devices, and transmits the control signal to the field devices such as valves as plant control information.

The upper-level communication apparatus 2 can be connected onto the arbitrary position on the transmission path 5, and can perform the monitoring and adjusting operations for the output values supplied from the field devices 1a, 1b and 1c by using the display and the keyboard placed in the upper-level communication apparatus 2.

The terminator 7 is composed of resistances and condensers connected in series, and is connected to the both lines of the transmission path 5. By means that the impedance of the terminator is made to be much smaller than the input impedance of the field device connected to the transmission path 5 in the communication frequency band to be used, the effect of the physical condition such as the number of field devices and their connection positions on the transmission path 5 over the communication signal may be reduced to be as small as possible.

With this configuration, in case that the terminator is disconnected from the transmission path, the impedance of the transmission path defined in terms of the field devices get to be larger, and then, the amplitude of the signals transmitted from the individual devices makes larger. Even if the amplitude of the signals transmitted from the individual devices connected onto the field bus is identical to one another, the amplitude of the transmitted signals measured on the arbitrary positions on the transmission path is not uniform but subject to the conditions including the driver circuit implementation, the length of the transmission path and the structure of the connectors. In this embodiment, a couple of terminators are connected individually onto both the safe area and the dangerous area separated by the barrier 6 in order to make the capacitance at the dangerous area smaller and make it easier to establish the essential safety explosion proof system, instead of connecting a couple of terminators together onto the dangerous area.

In responsive to the communication program embedded in MPU 31, the upper-level apparatus 3 communicates through the transceiver 32 with the transmitters such as the field devices 1a and 1b for detecting the plant physical values, receives the physical values such as pressure, flow rate and temperature in the plant process, and after processing the PID calculation, the upper-level apparatus 3 transmits the control signal for the plant to the field device 1c, for example, representing a valve, and thus, controls the plant process. This control operation is so scheduled as to be repeated in a constant interval between about 0.1 second and 2.0 second, and another communication tasks such as receiving the self diagnosis information of the field device other than the control operation are performed in the intervals of the communication for control operations. In case that the transmission of the communication data from the upper-level apparatus 3 is interrupted at least once by another device on the transmission pass, or that the communication between the upper-level apparatus 3 and the designated field device becomes abnormal in several times, MPU 31 judges that the former case is a transmission path error and that the later case is a device error, and MPU 31 transfers this judged result on the control network in order to display the error information on the display screen of the operator's console shown in FIG. 13.

Next, by referring to FIG. 1, the field device of the first embodiment of the present invention will be described. In this embodiment, what is shown is an example including a transmitter such as field devices 1a and 1b shown in FIG. 2 for detecting physical values of the plant process.

Figure 1:
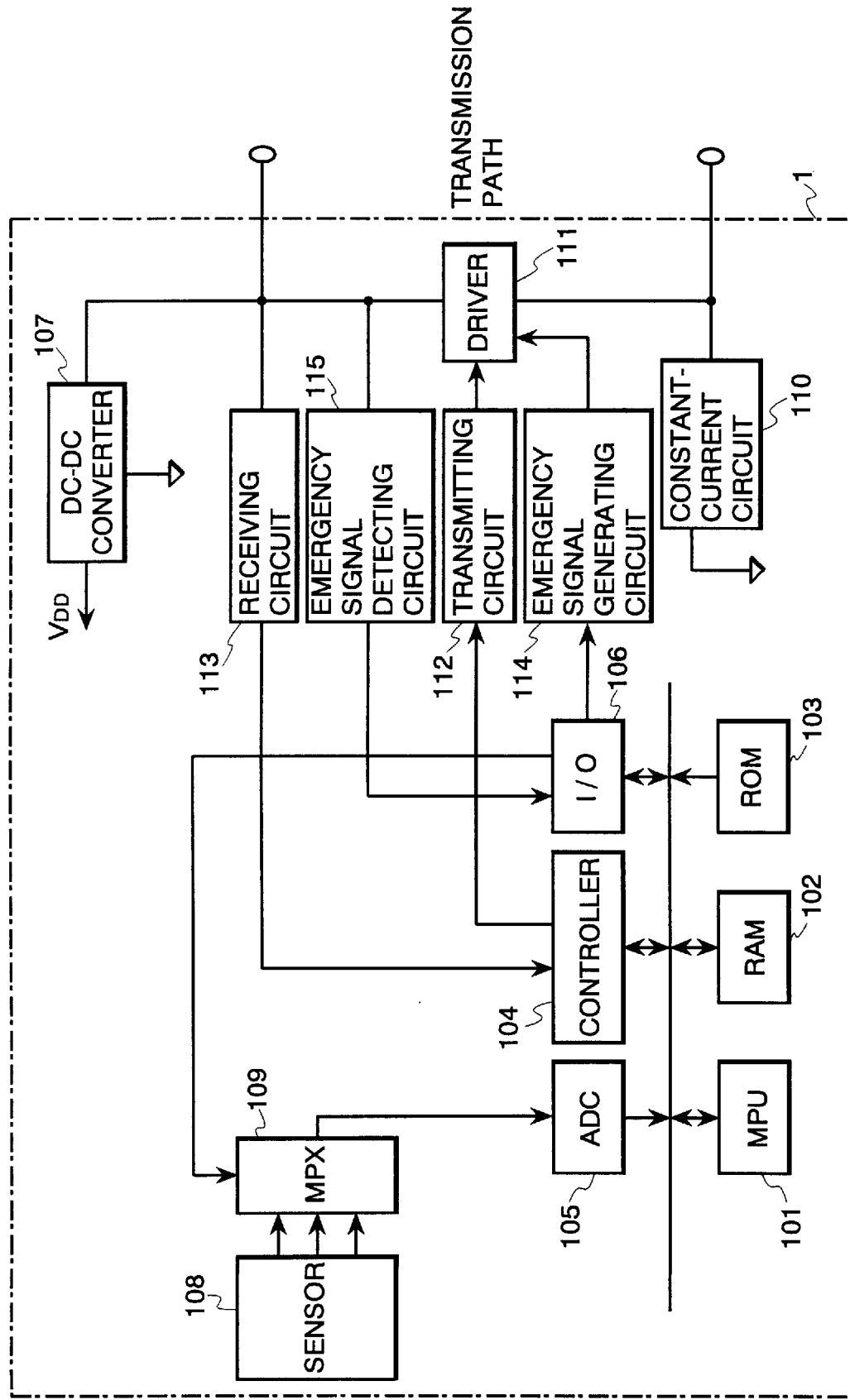
FIG. 1 is a block diagram of the field device in the first embodiment of the present invention.

DC-DC converter 107 in the field device 1 shown in FIG. 1 generates the voltage Vdd for operating the field device 1 itself from the voltage applied through the transmission path by the external electric power supply, and the constant electric current circuit 110 control the electric current supply so that the electric current consumption in the overall field device 1 may be constant. The compound sensor 108 detects plural physical values of the plant process, and the individual output signals from the compound sensor 108 are supplied to the multiplexer 109. The input switching signal is supplied from the I/O interface 106 to the multiplexer 109, and the output signal from the multiplexer 109 is supplied to the input of the A/D converter 105. The microprocessor 101 performs the correction calculation by using the individual physical observed values supplied by the A/D converter 105 and several coefficients stored in ROM 103 and RAM 102, and the actual values for the physical values are estimated and stored in RAM 102.

The communication operation by the field device 1 is described below.

In the transmission operation, at first, in responsive to the command from the microprocessor 101, the data stored in RAM 102 are supplied as serial digital signal from the controller 104. Next, this serial digital signal is coded by the transmitting circuit 112, and supplied to the driver 111, and is output from the driver 111 onto the transmission path as the communication signal. The coding method performed in the transmission circuit 112 may include the method of converting the data into the Manchester code on the base band signal or the method of modulating the frequency signal in corresponding to "1" or "0" of the digital signal. As for the driver method used in the driver 111, there are several alternative ways such as voltage signal output method and current signal output method. In the embodiment shown in FIG. 1, the current signal output method is used.

In the receiving operation, the communication signal supplied from the transmission path is decoded by the receiving circuit 113, and the coded signal is extracted as serial digital signal to be supplied to the controller 104 with "1" or "0" of the digital signal. The digital signal supplied to the controller 104 is extracted by the microprocessor 101 to be used as the receiving data.

Now, what is described below is the procedural operation of the field device 1 in case that the self diagnosis function of the field device 1 itself detects the abnormal state of the measurement target object or the abnormal state inside the field device 1 itself.

In case that the self diagnosis function of the field device 1 itself detects the abnormal state of the measurement target object or the abnormal state inside the field device 1 itself, in responsive to the command from the microprocessor 101, the emergency signal generation signal is supplied through the I/O interface 106 to the emergency signal generation circuit 114, and the emergency signal generation circuit 114 now receiving the emergency signal generation signal generates the emergency signal and transmits the emergency signal through the driver 111 onto the transmission path, with which the normal control signal is superposed on the transmission path. This emergency signal is not necessarily processed by the same transmission method as the transmission method used for the communication signal transmitted from the transmitting circuit 112, but the different transmission method is used in order to distinguish the emergency signal from the normal communication signal at the receiving circuit. For example, the emergency signal is transmitted in the form of pulsed trigger signal or burst signal in a specific frequency, and the condition for generating the emergency signal, for example, the emergency signal is transmitted in a plural time in a definite time interval or the amplitude of the signal is determined to be larger than an arbitrary defined value is determined before hand. With this transmission condition, the emergency signal and error signals can be surely discriminated and hence, error signals can not be recognized as a part of the emergency signal.

In case that either of the devices connected onto the transmission path generates the emergency signal, all the other devices on the transmission path can receives the generated emergency signal. When the field device receives the emergency signal, the emergency signal detecting circuit 115 detects the component of the emergency signal superposed on the signal transmitted on the transmission path and the result of detecting the existence of the emergency signal is transferred through the I/O interface to MPU 101.

As the emergency signal superposed on the signal transmitted on the transmission path is transmitted with the different transmission method from the transmission method used for the normal communication signal, the filter circuit not shown in the figure for detecting only the emergency signal transmitted with a specific transmission method is embedded in the emergency signal detecting circuit 115. Another filter circuit is also embedded in the receiving circuit 113 for receiving the normal communication signal in order to discriminate the component of the normal communication signal in contrast to the filter circuit of the emergency signal detecting circuit 115.

As the emergency signal is transmitted and received through the I/O interface in this embodiment, only the information related to the existence of the emergency signal on the transmission path can be recognized. In stead, by means that several patterns of transmission methods, each corresponding to the specific condition for transmitting emergency signal and normal signal, are prepared, the designated emergency information is transmitted by combining several transmission methods or using a single transmission method, and that the individual combination of transmission methods is defined with the abnormality level or the emergency level, additional information other than the existence of the emergency signal can be transmitted and received. Even in case that a single transmission method is used for transmitting the emergency signal, for example, the emergency signal is coded in the form of pulsed trigger signal, additional information can be transmitted by altering the signal intervals in order to generate several patterns of signals.

In case that the system using the field device of the present invention is small-scaled and does not require the emergency information defined in detail, the transmission method of this embodiment may be practically used. In the structure of this embodiment, the original circuits in the field device is not required to be modified largely, but only by adding the emergency signal generating circuit and the emergency signal detecting circuit, the field device enabling to transmit the emergency signal can be easily configured.

In the above description, what is described is related to the case in which the emergency signal is transmitted and received by the field device. The circuit for transmitting and receiving the emergency signal may be embedded in the upper-level apparatus, and in this case, the upper-level apparatus can detects the abnormal state of the individual devices and the measurement target objects on the field bus at arbitrary timing.

Figure 7:
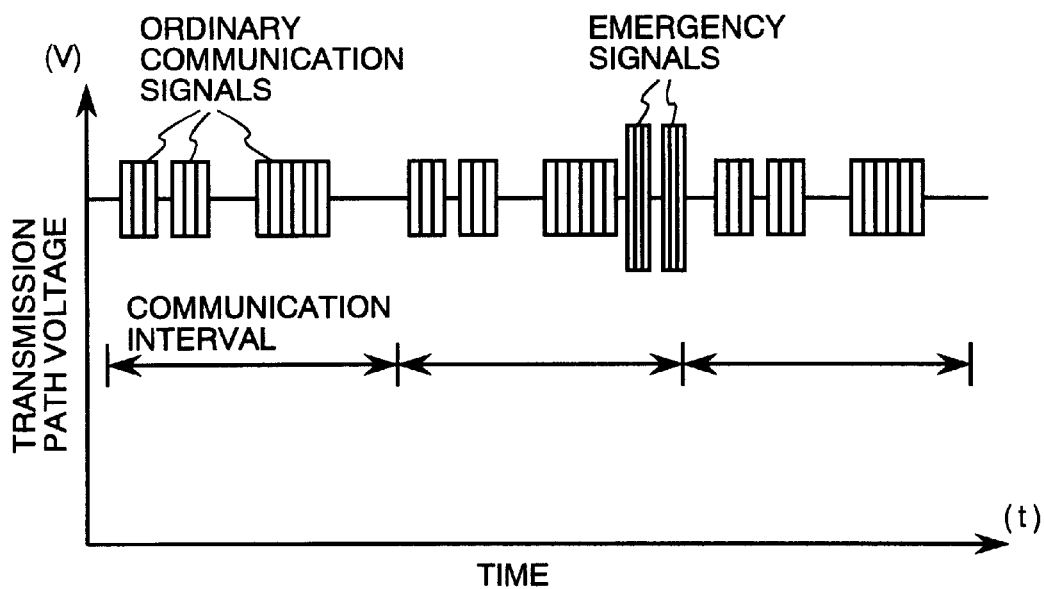
FIG. 7 is a signal state in case that the emergency signal is supplied onto the transmission path.

In FIG. 7, what is shown is a case that the emergency signal is superposed onto the signal transmitted on the transmission path.

Figure 8:
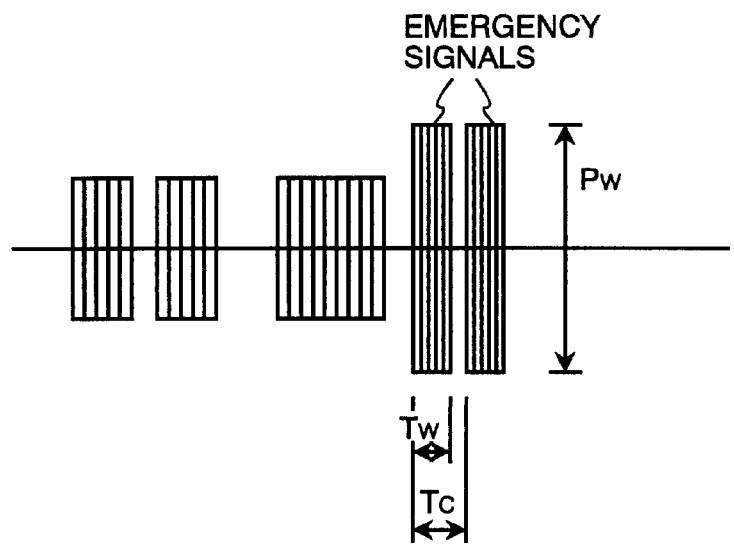
FIG. 8 is an example of the transmission of the emergency signal with the protection mechanism for error signal detection.

FIG. 8 is a detail view of the emergency signal shown in FIG. 7. In FIG. 8, the emergency signal is output with a specific frequency, a specific amplitude (Pw) and a specific time duration width (Tw), and the emergency signal is issued with a specific time interval (Tc) in a repetitive manner. By means that the receiving device recognizes the incoming signal as the emergency signal only when receiving the signal satisfying the condition (the specific amplitude (Pw), the specific width (Tw), and the specific interval (Tc)) predefined for the emergency signal, the discrimination between the emergency signal and the normal communication signal is assured and the reliability for detecting the emergency signal can be attained to be high enough.

In this embodiment, as the procedures for generating and detecting the emergency signal are performed by an independent circuit other than the circuit for performing the normal control and communication operation, the emergency signal can be promptly transmitted without interrupting the normal communication signal communicated by a control operation scheduled in a definite interval, and furthermore, the emergency signal can be surely transmitted when the transmitting and receiving circuits of the field device has an abnormal state, and consequently, a highly reliable system can be established.

For the field device which does not require either of the transmission of the emergency signal or the receiving of the emergency signal or both of them, for example, only monitors the normal communication signal, the mask procedure can be performed in order to neglect the emergency signal in responsive to the command from the upper-level apparatus. This means that the functions given by the emergency signal generating circuit 114 and the emergency signal detecting circuit 115 are suspended, and thus, by discarding the signal not necessary for the specified field device, more stable signal processing can be performed, leading to higher reliability for signal transmission.

Next, referring to the flowchart shown in FIG. 5, the overall operation of the decentralized control system is described.

FIG. 5 is an example of the plant control system for controlling the flow rate of the plant process by regulating the valve opening, in which the field device i is a differential pressure transmitter for detecting the flow rate of the plant process as the pressure difference, and the field device ii is a valve.

The differential pressure transmitter shown in FIG. 5(*a*) performs a sensing operation in a definite interval by the timer interruption, and performs a communication operation by the communication interruption. The priority level of the communication interruption is higher than that of the timer interruption, and in case that the communication interruption coincides with the timer interruption, the procedures related to the communication interruption are taken priority.

In responsive to the timer interruption, the sensor output is captured, and whether the sensor, the measurement target and the field device itself have an abnormal state or not is judged. In case that an abnormal state is judged to generate, the emergency signal is transmitted onto the transmission path 5 as described above. As the normal communication signal and the transfer of the electric power supply to the individual field device are performed on an identical transmission path, the emergency signal is superposed on those signals, and hence, the transmission of the emergency signal is not required to be synchronized with the transmission of the normal communication signal but can be transmitted at an arbitrary timing.

The valve shown in FIG. 5(*b*) receives the control command requesting the valve opening from the upper-level apparatus as the communication interruption, and performs the valve opening control for regulating the flow rate of the plant process in order to respect the control command issued by the upper-level apparatus.

In case that the emergency signal is putout from the differential pressure transmitter onto the transmission path 5 and the emergency signal detecting circuit of the valve receives this emergency signal, if the function for detecting the emergency signal is not masked (suspended), the emergency signal interruption occurs and the emergency signal processing is performed by the valve. In this embodiment, by means that the flow rate of the plant process is adjusted to be zero by closing completely the valve, the overall state of the plant process is so controlled as to transit to a safer mode under the emergency signal operation.

In this system, as for the priority level for the interruption process, the priority order is defined so that the emergency signal interruption is the highest, the communication interruption is middle, and the timer interruption is the lowest.

As found to be apparent from the above description, when the individual field device connected to the transmission path detects the abnormal state, as the individual field device outputs independently the emergency signal onto the transmission path and another field device receives the issued emergency signal at any time, the emergency signal can be exchanged only with the field devices themselves. For example, by means that the differential pressure transmitter detects the abnormal state of the plant process and transmits the emergency signal onto the transmission path to be superposed on the normal control signal, the emergency signal can reach the valve connected to the transmission path without interacting the upper-level apparatus, and hence, the valve can be operated so as to make the state of the plant process transit to the safer mode. Thus, this kind of shutdown loop so configured as described above can be only with a single transmission path and field devices connected to the transmission path.

Next, by referring FIG. 3, the third embodiment of the present invention is described.

This embodiment is also applied to the instrument and control system as shown in FIG. 2, in which the configuration of the field bus system is similar to that shown in the first embodiment.

In FIG. 3, the components other than those related to the signal transmission for the emergency signal has the same functions as the field devices shown in FIG. 1. The major difference in this embodiment from the first embodiment shown in FIG. 1 is that the emergency signal is transmitted as data handled in the similar manner to the normal control communication operation other than the transmission of a simple signal, and that an independent circuit equivalent to the circuit for transmitting and receiving the normal communication signal is embedded exclusively for the emergency signal.

The components exclusively used for transmitting and receiving the emergency signal include the emergency signal controller 104', the emergency signal transmitting circuit 112' and the emergency signal receiving circuit 113'. Though the number of circuits required for transmitting and receiving signals is twice as large as the conventional system, it will be appreciated that the emergency signal is not formed as a simple signal but formed as a compound signal including data such as communication signals, and hence, the emergency signal including addition information reporting the device identification information and the abnormal state description can be transmitted, and value-added emergency operation can be enabled.

The communication operation is described by referring to FIG. 3.

The communication operation by the field device 1 is described below.

In the transmission operation, at first, in responsive to the command from the microprocessor 101, the data stored in RAM 102 are supplied as serial digital signal from the controller 104. Next, this serial digital signal is coded by the transmitting circuit 112, and supplied to the driver 111, and is output from the driver 111 onto the transmission path as the communication signal. The coding method performed in the transmission circuit 112 may include the method of converting the data into the Manchester code on the base band signal or the method of modulating the frequency signal in corresponding to "1" or "0" of the digital signal. As for the driver method used in the driver 111, there are several alternative ways such as voltage signal output method and current signal output method. In the embodiment shown in FIG. 3, the current signal output method is used.

In the receiving operation, the communication signal supplied from the transmission path is decoded by the receiving circuit 113, and the coded and converted signal is extracted as serial digital signal to be supplied to the controller 104 with "1" or "0" of the digital signal. The digital signal supplied to the controller 104 is extracted by the microprocessor 101 to be used as the receiving data.

Next, the communication operation in case of transmitting the emergency information is described.

In case that the self diagnosis function of the field device 1 itself detects the abnormal state of the measurement target object or the abnormal state inside the field device 1 itself, in responsive to the command from the microprocessor 101, the emergency signal is transmitted from the emergency signal transmitting circuit 112' through the emergency signal controller 104' and the driver 111 onto the transmission path. Though the communication data transmitted on the transmission path contain the superposed signals including the issued emergency signal. However, by means that the transmission method for the emergency signal is made to be different from the transmission method used for the communication signal transmitted from the transmitting circuit 112, even if the emergency signal and the communication signal are received coincidentally, the emergency signal and the communication signal can be recognized separately by using the filter (not shown) for discriminating the emergency signal and the communication signal at the individual emergency signal receiving circuit 113' of the field device connected to the transmission path.

In this embodiment, the circuit for communicating the normal control signal and the circuit for communicating the emergency signal are defined independently. With this configuration, the emergency signal can be promptly transmitted without interacting with the normal communication signal communicated by a control operation scheduled in a definite interval, and furthermore, the emergency signal can be surely transmitted when the transmitting and receiving circuits of the field device has an abnormal state, and consequently, a highly reliable system can be established.

The receiving circuit 113 has a function equivalent to the function of the emergency signal receiving circuit 113', and the controller 104 has a function equivalent to the function of the emergency signal controller 104', and as the communication signal and the emergency signal are put into the both circuits, the communication signal can be received and processed by the emergency signal receiving circuit 113' and the emergency signal controller 104'. (This receiving operation can be easily realized by means that a couple of filter circuits for detecting the communication signal or the emergency signal are placed in the receiving circuit 113 and the emergency signal receiving circuit 113'.) This is a dual configuration of the receiving circuits, in which, if the receiving circuit 113 or the controller fails, the field device can continue to operate and the communication with another device can be continued, leading to highly reliable devices and systems. In other words, the receiving circuits are configured in a dual system with respect to the emergency signal, and the reliability of the system with respect to the emergency communication can be increased. In addition, as the communication system circuits are configured in a dual system, a couple of received data can be compared at the receiving circuits, and the high reliable network system can be established.

As for the transmission method for the emergency signal, for example, the frequency band for the emergency signal is made to be different from the frequency band for the normal communication signal, which enables the emergency communication and the normal control communication concurrently.

The overall operation of the decentralized system of the second embodiment is similar to the flowchart of the first embodiment shown by FIG. 5. In contrast to the first embodiment, more detail information related to the emergency signal can be operated in the second embodiment. Therefore, though the emergency signal output by the field device can be received by all the devices connected to the transmission path, as the emergency signal can be received and operated as data, it is allowed to transmit the emergency signal to a specific field device and/or to transfer the detail information related to the abnormal state. Thus, the necessary field device can perform the emergency operation in accordance with the abnormal state of the device and the system, and consequently, more efficient control action can be performed. In addition, in considering the emergency level, various kind of emergency operations can be easily implemented.

Next, an example of the system application using the first and second embodiments is described.

Figure 4:
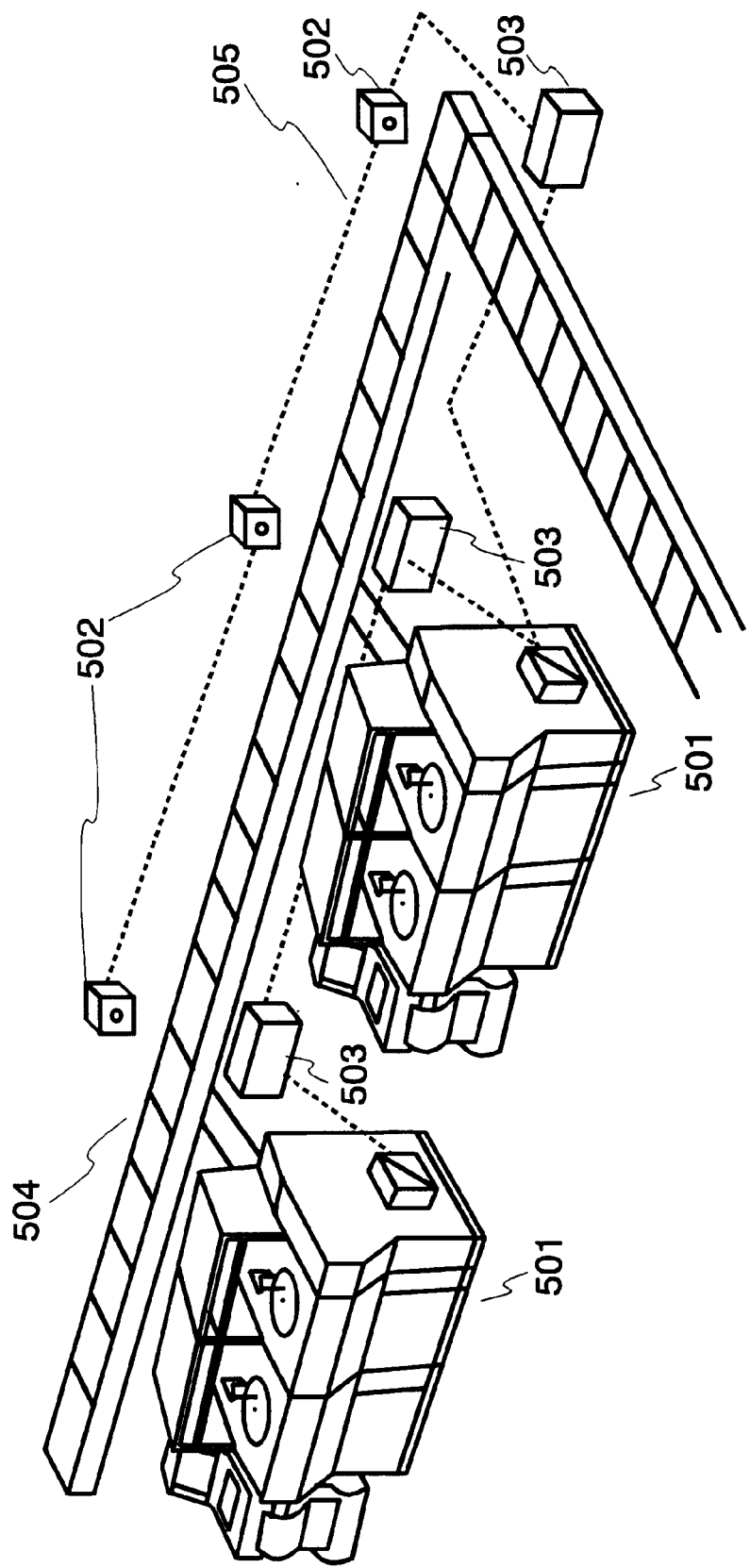
FIG. 4 is a structural configuration of the test sample conveying system using the present invention.

This embodiment is an example applying the present invention to the test sample handling system in which plural medical analysis apparatus are assembled and connected by the test sample conveying system as shown in FIG. 4.

In case of analyzing the test sample in the test sample handling system, the test sample to be analyzed by the individual medical analysis apparatus in the test sample handling system is put into a designated container and mounted on the test sample conveying system 504. The test sample mounted on the test sample conveying system 504 is moved on the test sample conveying system 504 by driving the motors located as the designated positions on the test sample conveying system 504. When the test sample moves at the designated analysis apparatus 501, the motor is stopped in order to suspend the movement of the test sample conveying system, and the test sample is carried in the analysis apparatus 501. When the test sample with its analysis completed is mounted again on the test sample conveying system 504, the motor is again stopped in order to carry the test sample back to the test sample conveying system 504, and the motor is started for moving the test sample to the next analysis apparatus, if necessary. Thus, by controlling the motors, the test sample is carried into the designated analysis apparatus.

There are plural motors in the test sample conveying system 504, and the individual motors are controlled by the motor controllers 503 located at the designated positions on the test sample conveying system 504. As for the control of the overall test sample conveying system governed by the conveying system controller, the conveying system controller is embedded in the individual analysis apparatus, or the conveying system controller is placed independently outside the analysis apparatus. In this embodiment, what is shown is an example with the conveying system controller embedded in the individual analysis apparatus.

As described above, the control of the test sample conveying system of this embodiment is performed by the command issued by the conveying system controller embedded in the individual analysis apparatus 501, and the detection of the position of the test sample is observed by the photo sensor 502 mounted on the test sample conveying system. The photo sensor 502 is located at the specified position on the conveying system, and used for detecting the position of the moving test sample at a constant time interval. The analysis apparatus 501, the motor controller 503 and the photo sensor 502 are linked by a couple of transmission lines 505, respectively, and form a field network, LonWorks, DeviceNet and so on.

In the analogy to the first and second embodiments, the photo sensor 502 of this embodiment corresponds to the field device i (differential pressure transmitter), and the motor controller 503 corresponds to the field device ii (valve), and the conveying system controller embedded in the analysis apparatus 501 corresponds to the upper-level apparatus. Similarly to the first and second embodiments, the circuit for the emergency signal is applied also to the photo sensor 502 and the motor controller 503 used as the field devices.

Next, by referring to the flowchart shown in FIG. 6, the overall operation of the test sample conveying system is described.

In FIG. 6(*a*), the photo sensor 502 observes the conveying system at a constant time interval in responsive to the timer interruption. In parallel to this observation process, if the communication interruption arises and is accepted by the photo sensor, the communication process takes priority in the photo sensor and the observation process is suspended.

In the observation process invoked by the timer interruption, the abnormal state of the conveying system and the photo sensor itself is observed, and in case that the abnormal state is found in the conveying system 504 and/or the photo sensor 502 itself, the emergency signal is output onto the transmission line 505 in the same way as the first and second embodiments described above. As the transmission method for the emergency signal is made to be different from that for the normal communication signal in the same way as the embodiments described before, it is not required to synchronize the emergency signal with the normal communication signal but allowed to transmit the emergency signal at an arbitrary timing.

In FIG. 6(*b*), the motor controller 503 receives the data on the transmission line 505 in responsive to the communication interruption. If the data contain the control command issued by the conveying system controller for specifying the moving distance of the test sample, the motor controller 503 interprets the data as the rotations of the motor and controls the motor so as to respect the control command issued by the conveying system controller and locate the test sample to the designated position. In case that the emergency signal issued on the transmission line 505 from the photo sensor 502 is received by the emergency signal detecting circuit of the motor controller 503, if the function for detecting the emergency signal is not masked, the emergency signal interruption arises in the motor controller and the motor controller performs the emergency process. In this embodiment, if the emergency signal interruption arises while the motor is driven, the motor speed is decreased gradually until the motor stops in order to disturb the test sample, and thus, the overall test sample conveying system is so controlled as to transit to the safer mode.

As found to be apparent from the above description, similarly in this embodiment, in case the photo sensor detects the abnormal state while conveying the test sample, as the emergency signal can be received by all the devices connected to the transmission line 505 by means that the photo sensor 502 outputs the emergency signal indicating the abnormal state onto the transmission line 505 (and if the function for detecting the emergency signal is not masked), the emergency operation such as emergency stop of the conveying system can be promptly done without interacting with the conveying system controller in the analysis apparatus.

Therefore, as the test sample is safely conveyed without damaging the test sample, a highly reliable test sample conveying system can be configured.

So far, one embodiment related to the communication method for emergency operation has been described.

As found to be apparent from the above description, by forming the control system by using the decentralized system of the present invention, it will be appreciated that the emergency signal can be exchanged promptly among the field devices without interacting with the upper-level apparatus by superposing the emergency signal onto the transmission path when the field device detects the abnormal state of the field device and/or the controlled target object.

It will be appreciated that the controlled target object can be controlled so as to transit to the safer mode because the emergency signal can be transmitted quickly.

In addition, it will be appreciated that a highly reliable decentralized system operable even when the internal circuit in the field device has an abnormal state can be established, by means that the circuit for the normal control communication and the circuit for transmitting and receiving the emergency signal are defined separately.

Figure 9:
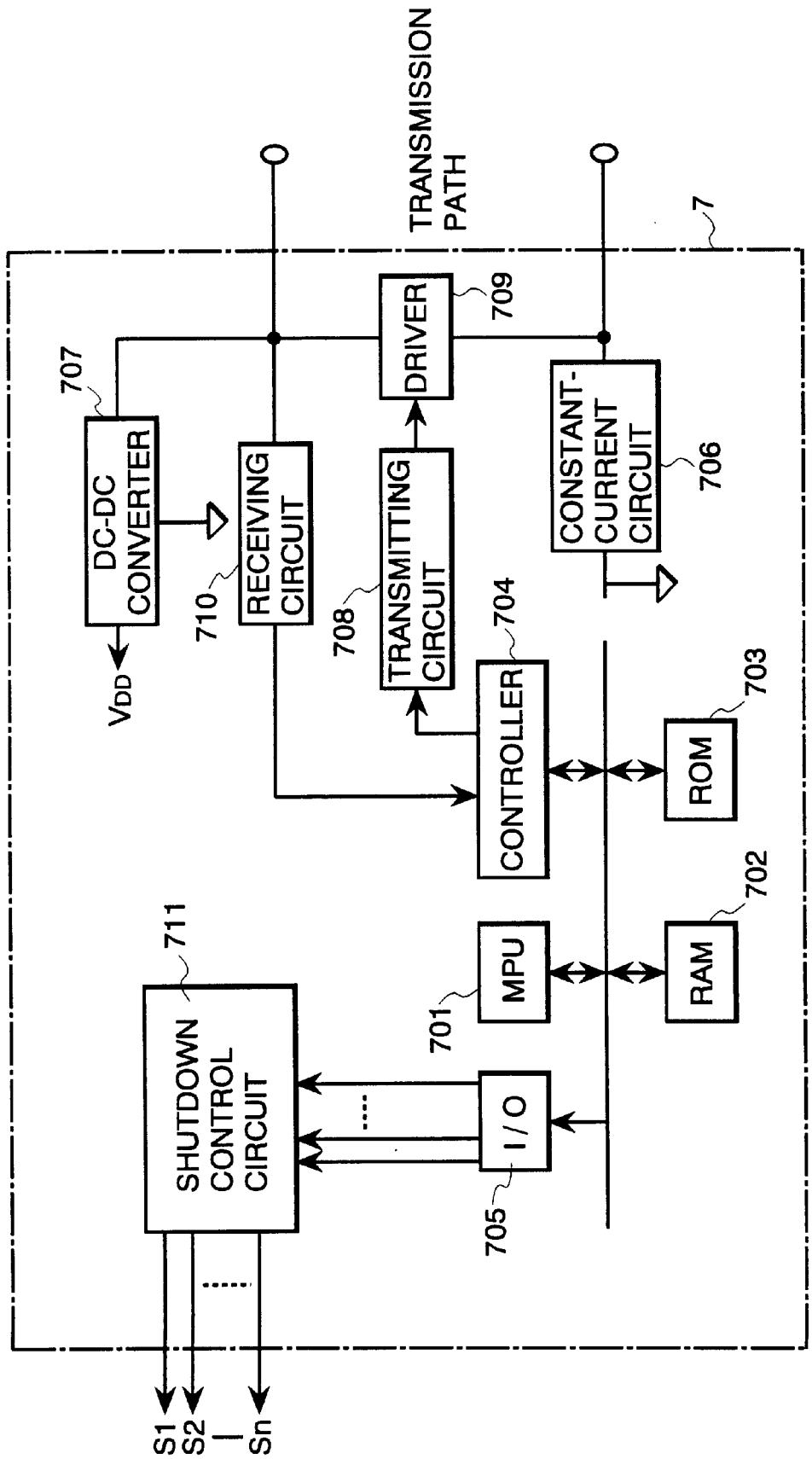
FIG. 9 is a block diagram of the shutdown control apparatus in the third embodiment of the present invention.
Figure 10:
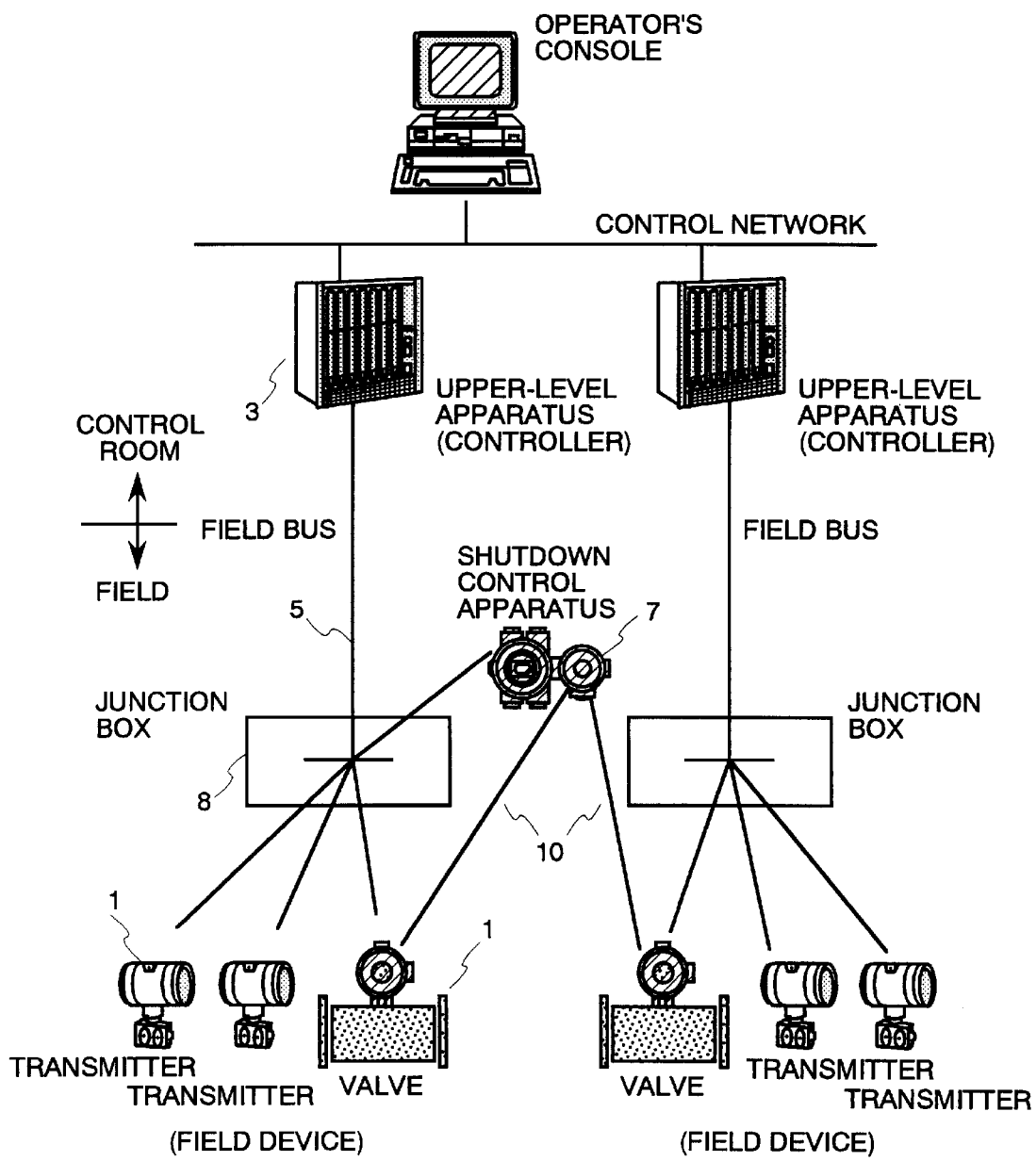
FIG. 10 is a system configuration diagram of the decentralized system in the third embodiment of the present invention.

Next, by referring to FIGS. 9 and 10, the third embodiment related to the network control at the emergency operation is described.

FIG. 10 shows the system configuration in this embodiment, and its basic structure is the same as the first and second embodiment. The specific feature of this embodiment is that the shutdown control apparatus 7 is placed at the field side.

Though the shutdown control apparatus 7 is connected to the junction box 6 in this embodiment, it is allowed to connect the shutdown control apparatus 7 to an arbitrary position on the transmission path 2. The major function of the shutdown control apparatus 7 is to detect the abnormal state of the individual device connected to the transmission path 2 and perform the shutdown control directly through the shutdown control signal line 10 to the shutdown target device such as valve. Thus, the shutdown target devices such as valve can be controlled so as to make the plant process transit to the safer mode.

Though the shutdown target device is exemplified with valves in the above description, it is allowed to define the shutdown target device to be any device connected to the transmission path. This assumption is valid for the ordinary control environment in which the physical control in the system uses actuators such as valves. The shutdown control signal line 10 from the shutdown control apparatus 7 is connected to the individual shutdown target devices and separated from the field bus 5.

Next, by referring to FIG. 9, the detail configuration of the shutdown control apparatus 7 of this embodiment is described.

In the shutdown control apparatus 7, DC-DC converter 707 generates the voltage $V_{DD}$ used for operating the shutdown control apparatus 7 itself from the voltage applied through the transmission path by the external power source, and the constant-current circuit 706 regulates the electric current consumption to be constant in the shutdown control apparatus 7.

The communication operation of the shutdown control apparatus 7 is as followings. In the transmission operation, at first, in responsive to the command from the microprocessor 701, the data stored in RAM 702 are supplied as serial digital signal from the controller 704. Next, this serial digital signal is coded by the transmitting circuit 708, and is output from the driver 709 onto the transmission path as the communication signal. The coding method performed in the transmission circuit 708 may include the method of converting the data into the Manchester code on the base band signal or the method of modulating the frequency signal in corresponding to "1" or "0" of the digital signal. As for the driver method used in the driver 709, there are several alternative ways such as voltage signal output method and current signal output method. In the embodiment shown in FIG. 9, the current signal output method is used.

In the receiving operation, the communication signal supplied from the transmission path is decoded by the receiving circuit 710, and the coded signal is extracted as serial digital signal to be supplied to the controller 704 with "1" or "0" of the digital signal. The digital signal supplied to the controller 704 is extracted by the microprocessor 701 to be used as the receiving data.

In case that another field device detects the abnormal state of the measurement target object or the abnormal state of the field device it self, in responsive to the command of the microprocessor 701, the shutdown control apparatus 7 transmits the shutdown control signal to the individual field device with the shutdown control circuit 711 through the I/O interface 705.

When the shutdown control signal is received by the field device, the electric power supplied from the transmission path to the field device is suspended and the field device is shut down.

Also in case that the field device for detecting the abnormal state of the plant process or the transmission path 5 used for signal and data communication has an abnormal state, as the shutdown control apparatus 7 is independently connected through the control signal line 10 to the shutdown target control apparatus, the shutdown control apparatus 7 can shutdown the important control loops, and hence, it will be appreciated that a highly reliable decentralized system can be established. In this embodiment, the circuit for communicating the normal control signal and the circuit for communicating the emergency signal are defined independently. With this configuration, the emergency signal can be promptly transmitted without interacting with the normal communication signal communicated by a control operation scheduled in a definite interval, and furthermore, the emergency signal can be surely transmitted when the transmitting and receiving circuits of the field device has an abnormal state, and consequently, a highly reliable system can be established.

Next, as shown in FIG. 10, in the operation of the overall decentralized control system, in case that the shutdown control apparatus 7 detects the abnormal state of the plant process and/or the field device, the shutdown control apparatus 7 outputs the shutdown control signals S1, S2 to Sn to the field device 1. Therefore, the emergency signal can be transmitted only between the field device and the shutdown target device; for example, after the field device 1 (transmitter) detects and outputs the abnormal state of the plant process, the emergency signal can be transmitted directly to the field device 1 (valve) without interacting with the upper-level apparatus, and thus, such a shutdown loop that the field device 1 (valve) can operates the control target object of the plant process so as to transit to the safe mode can be established.

Figure 11:
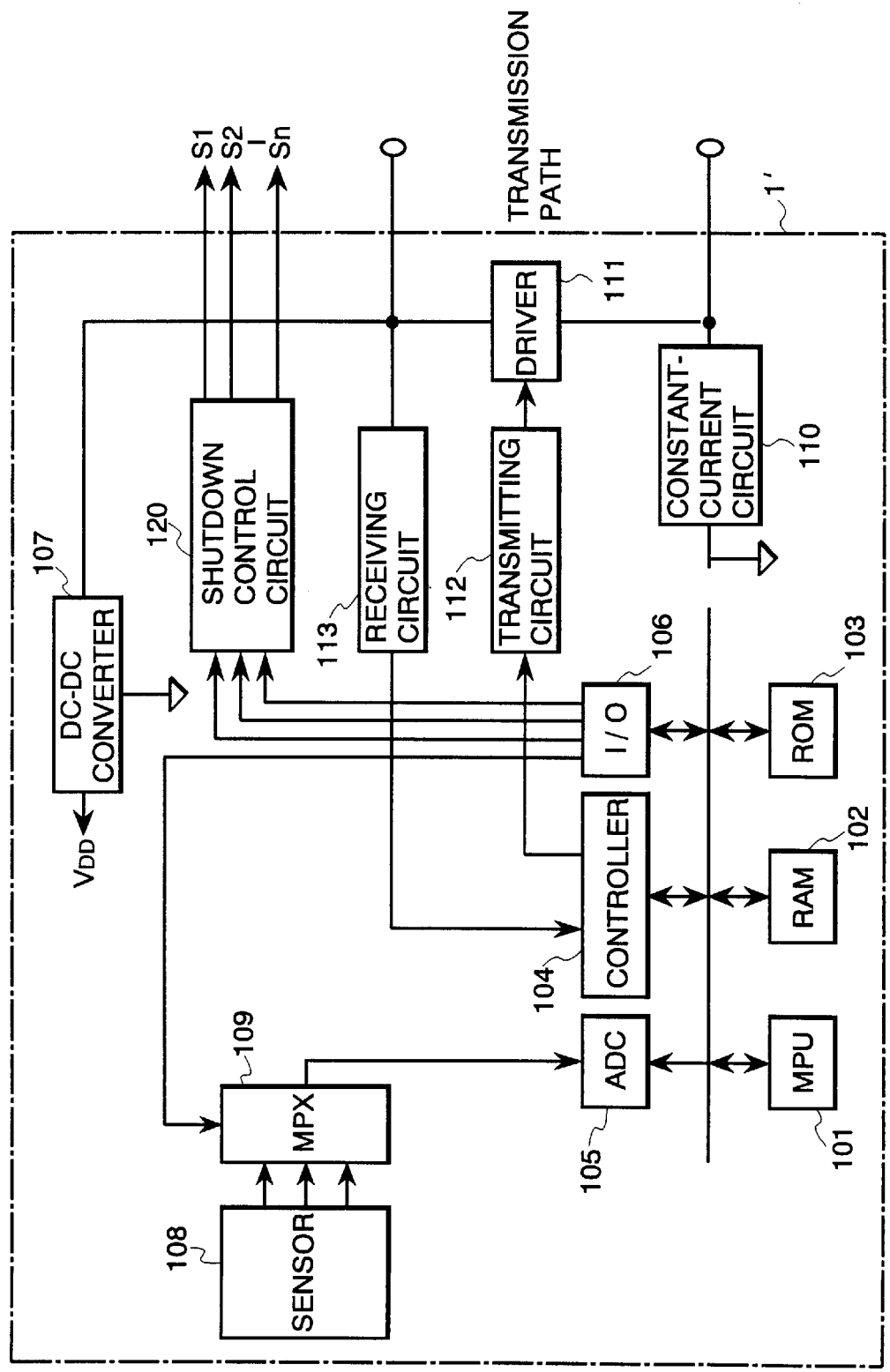
FIG. 11 is a block diagram of the field device in the forth embodiment of the present invention.
Figure 12:
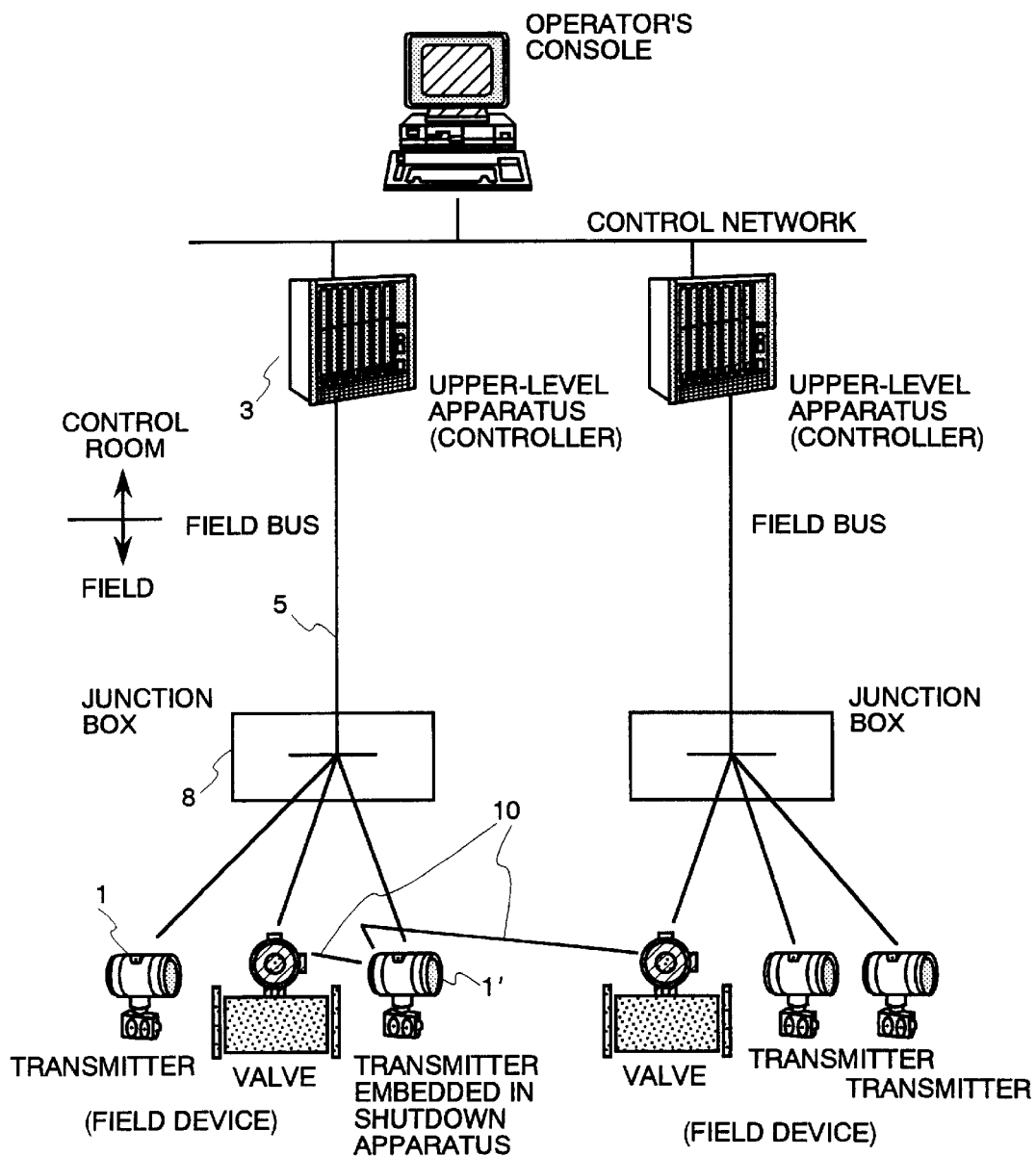
FIG. 12 describes a system configuration of the decentralized system in the forth embodiment of the present invention.

Next, by referring to FIGS. 11 and 12, the forth embodiment of the present invention is described. This embodiment is an example of applying the present invention to the instrument and control system as shown in FIGS. 1 and 2, and the structure of the field bus system is the same as the embodiment shown in FIGS. 1 and 2 except that the shutdown control system is embedded inside the field device.

By referring to FIG. 11, the field device in which the shutdown control apparatus of the present invention is described.

In FIG. 11, DC-DC converter 107 generates the voltage $V_{DD}$ used for operating the shutdown control apparatus 7 itself from the voltage applied through the transmission path by the external power source, and the constant-current circuit 110 regulates the electric current consumption to be constant in the field device 1'. The individual outputs of the compound sensor 108 are input to the multiplexer 109. The input switching signal from the I/O interface 106 is put into the multiplexer 109, and the output of the multiplexer 109 is put into the A/D converter 105. The microprocessor 101 performs the correction calculation by using the individual physical observed values supplied by the A/D converter 105 and several coefficients stored in ROM 103 and RAM 102, and the actual values for the physical values are estimated and stored in RAM 102.

The communication operation by the field device 1 is described below. In the transmission operation, at first, in responsive to the command from the microprocessor 101, the data stored in RAM 102 are supplied as serial digital signal from the controller 104. Next, this serial digital signal is coded by the transmitting circuit 112, and supplied to the driver 111, and is output from the driver 111 onto the transmission path as the communication signal. The coding method performed in the transmission circuit 112 may include the method of converting the data into the Manchester code on the base band signal or the method of modulating the frequency signal in corresponding to "1" or "0" of the digital signal. As for the driver method used in the driver 111, there are several alternative ways such as voltage signal output method and current signal output method. In the embodiment shown in FIG. 11, the current signal output method is used.

In the receiving operation, the communication signal supplied from the transmission path is decoded by the receiving circuit 113, and the coded signal is extracted as serial digital signal to be supplied to the controller 104 with "1" or "0" of the digital signal. The digital signal supplied to the controller 104 is extracted by the microprocessor 101 to be used as the receiving data.

In case that the self diagnosis function of the field device 1 itself detects the abnormal state of the measurement target object or the abnormal state inside the field device 1 itself, in responsive to the command from the microprocessor 101, the shutdown control signals S1, S2 and Sn are supplied through the I/O interface 106 from the shutdown control circuit 120. This shutdown control signal is put out in accordance with the emergency level defined before hand. For example, in case of trying to shutdown the whole plant control process, by means that the control signal lines 10 are connected to all the field devices as the shutdown target control apparatus in such plant control processes as shown in FIGS. 10 and 12, the shutdown control command can be issued to the field device 1 (valve) connected to another field bus. Therefore, in case that the field device 1' which contains the shutdown control apparatus detects the abnormal state of the plant process or the sensor, the field device such as valves used for the control operation can be directly under shutdown control operation, and hence, the shutdown operation can be performed promptly without interacting with the upper-level apparatus.

As in the same way as the first and second embodiments, the above described third and forth embodiments can be applied to the test sample conveying system in which plural medical analysis apparatus are assembled and connected with the test conveying system as shown in FIG. 4.

According to the test sample conveying system to which the third and forth embodiments are applied, by means that the shutdown control apparatus is placed on the network or embedded in the photo sensor, the abnormal state in the position control for the test sample while conveying the test sample can be detected by the photo sensor, and the control signal from the shutdown control apparatus can be put out directly to the motor controller and the emergency stop operation for the conveying system can be performed promptly without interacting with the controller in the analysis apparatus. With this configuration, as the test sample is safely conveyed without damaging the test sample, a highly reliable test sample conveying system can be configured.

By forming the control system by using the shutdown control apparatus and the decentralized system of the third and forth embodiments, it will be appreciated that the emergency signal can be exchanged promptly only between the shutdown control apparatus and the field devices without interacting with the upper-level apparatus when the field device detects the abnormal state of the field device and/or the controlled target object. It will be appreciated that the controlled target object can be controlled so as to transit to the safer mode because the emergency signal can be transmitted quickly.

In addition, it will be appreciated that a highly reliable decentralized system operable even when the internal circuit in the field device has an abnormal state can be established, by means that the circuit for the normal control communication and the circuit for transmitting and receiving the emergency signal are defined separately.

According to the above described four embodiments of the present invention, in the field network for performing the decentralized control operation, even in case that the abnormal state is generated in the plant process and/or the field device, as the information related to the abnormal state can be transferred quickly to another device on the network without interacting with the upper-level apparatus, it will be appreciated that the individual device can independently control the plant process so as to transit to the safer mode, and consequently, the effect of the generated abnormal state can be kept from expanding to the whole network system. In addition, by means of placing the shutdown control apparatus on the individual network, when the field device runs away out of control, other related devices can be shutdown without interacting with the upper-level apparatus, and hence, a highly reliable system can be established.

What is claimed is:

1. A decentralized control system configuring a network between plural field devices for measuring and controlling a controlled object and an upper-level apparatus for communicating data to said field devices and controlling said field devices, and forming a control loop among said devices, wherein said field device has a normal communication means for communicating with other devices in a normal operation mode; and an emergency communication means for communicating with other devices in an emergent operation mode, wherein said normal communication means and said emergency communication means use their own communication signals; and said emergency communication means operates in an asynchronous communication mode.

2. A decentralized control system of claim 1, wherein after said individual field device detects an emergency signal on said transmission path, said individual field device interrupts a control operation of a field device operated in a normal operation mode and switches an operation mode to an emergency operation mode in order to control a controlled object in a safer status.

3. A decentralized control system of claim 1, wherein said emergency communication means is composed of an emergency signal transmitting circuit, an emergency signal receiving circuit and an emergency signal controller;

and said emergency signal receiving circuit and said emergency signal controller are connected to a field device through said emergency signal controller; and an emergency signal is transmitted and received as a data sequence coded in a definite format.

4. A decentralized control system of claim 1, wherein said emergency communication means is so configured as to enable to report a status of a field device urgently even in case that said normal communication means of said field device is in an abnormal state.

5. A decentralized control system of claim 1, wherein said emergency communication means is composed of an emergency signal generating circuit and an emergency signal detecting circuit;

said emergency signal generating circuit and said emergency signal detecting circuit are connected to a field device through an I/O interfaces of said field device; and an emergency signal is communicated with a series of signals used by a transmission method different from a transmission method used by a normal communication method.

6. A decentralized control system of claim 5, wherein said emergency signal detecting circuit generates an emergency signal in responsive to an emergency signal generating signal incoming from said I/O interface.

7. A decentralized control system configuring a network between plural field devices obtaining electric operation power from a transmission path for measuring and controlling a controlled object and plural upper-level apparatus for communicating data to said field device and controlling said field device, and forming a control loop among said devices, further comprising a shutdown control means formed on said network for detecting an abnormal state of an individual device and, if necessary, supplying a shutdown command to a shutdown target control device for which a shutdown operation is required, said shutdown control means and said shutdown target device being connected by an independent control signal line other than said transmission path.

8. A decentralized control system of claim 7, wherein said shutdown control means and said shutdown target device are connected by an independent control signal line other than said transmission path.

9. A decentralized control system of claim 7, wherein a device connected to said shutdown control means by said independent control signal line is a field device performing a physical control operation for said system.

10. A decentralized control system of claim 7, wherein said shutdown control means is embedded in a field device.

11. A decentralized control system of claim 7, wherein said shutdown control means is established to be independent of an individual field device on said transmission path.

12. A decentralized control system of claim 7, wherein said shutdown control means is placed in a relay terminal assembly, and said independent signal line is connected between said relay terminal assembly and a shutdown target device.

13. A decentralized control system of claim 7, wherein an operation power supply from said transmission path to said shutdown target device is interrupted by means that said shutdown target device receives a shutdown signal supplied on said independent signal line.

14. A shutdown control apparatus arranged in a decentralized control system configuring a network between plural field devices obtaining electric operation power from a transmission path for measuring and controlling the controlled objects and plural upper-level apparatus for communicating data to a field device and controlling said field device, and forming a control loop among said devices, for shutting down an individual device, further comprising an independent control signal line other than said transmission path connected to an individual shutdown target device requiring shutdown control;

an abnormality detection means for detecting an abnormal state of an individual device on said network; and a shutdown control circuit for sending a shutdown command through said control signal line on the basis of a result of detection by said abnormality detection means, said shutdown control circuit establishing connection between the field device requiring shutdown and a shutdown command dedicated line.

15. A shutdown control system of claim 14 wherein said shutdown control means is embedded in a field device.

16. A shutdown control apparatus arranged in a test sample conveying system, said test sample conveying system forming a control loop with the individual devices, and configuring a network through a transmission path between a field device composed of a motor for driving a conveying system or a sensor for detecting a position of a conveyed object, and an upper-level apparatus for communicating with said field device and controlling said field device, further comprising, for shutting down an individual device, a control signal line connected to said field device including the motor;

an abnormality detection means for detecting an abnormal state of an individual device on said network;

and a shutdown control circuit for sending a shutdown command through said control signal line for stopping said motor on the basis of a result of detection of said abnormality detection means, said shutdown control circuit establishing connection between the field device requiring shutdown control and a shutdown command dedicated line.

* * * * *